Feb. 24, 1931. J. C. BONNER 1,793,901
VEHICLE ALIGNING, ELEVATING, AND STORING MEANS
Filed Oct. 18, 1929 3 Sheets-Sheet 2
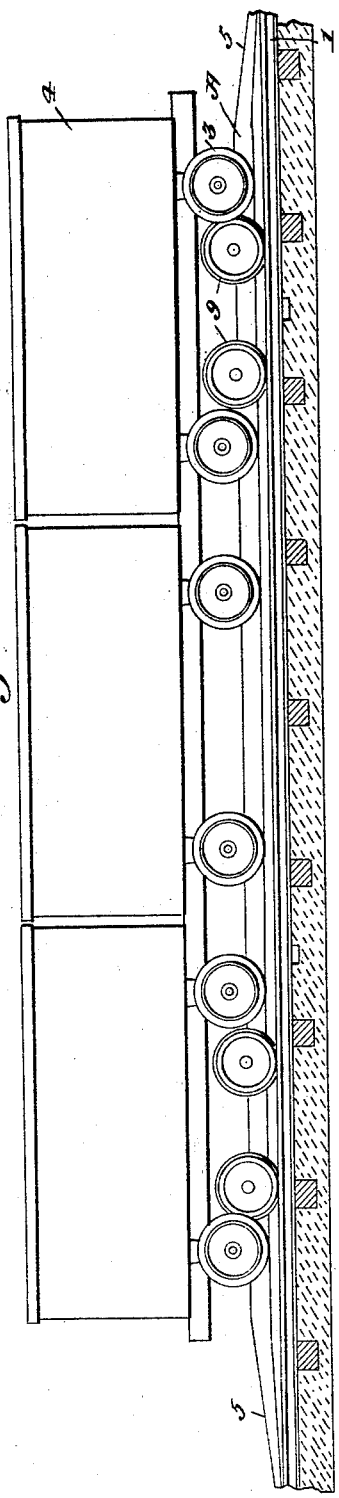
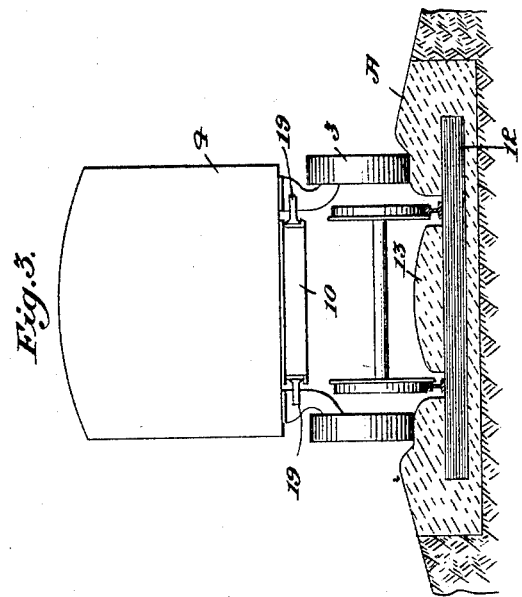
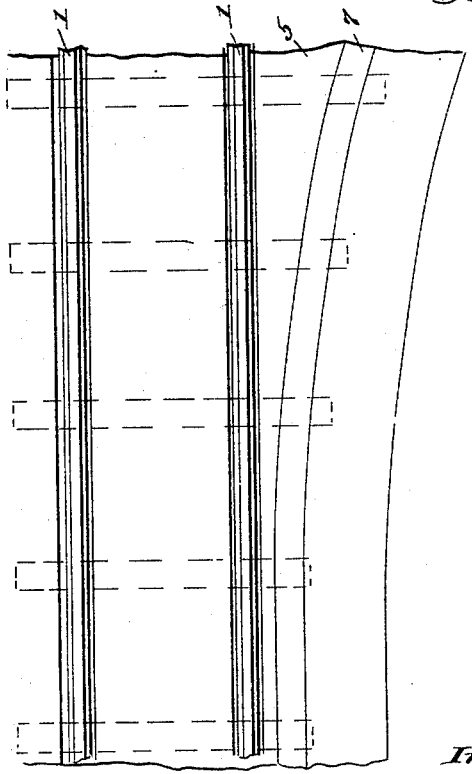
Inventor:
Joseph C Bonner
By H. P. McElroy.
Att'y.

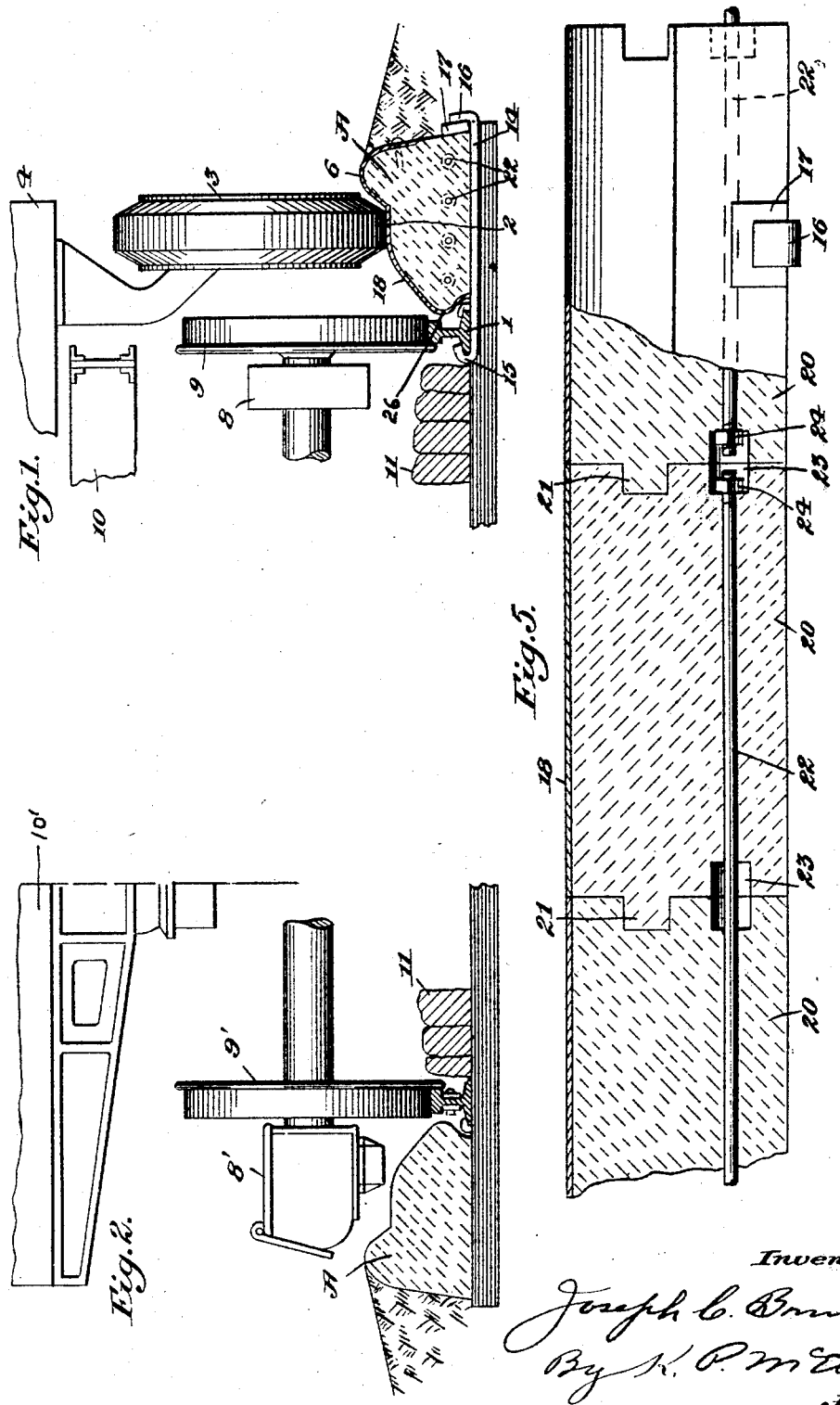

Feb. 24, 1931.  J. C. BONNER  1,793,901
VEHICLE ALIGNING, ELEVATING, AND STORING MEANS
Filed Oct. 18, 1929   3 Sheets-Sheet 3
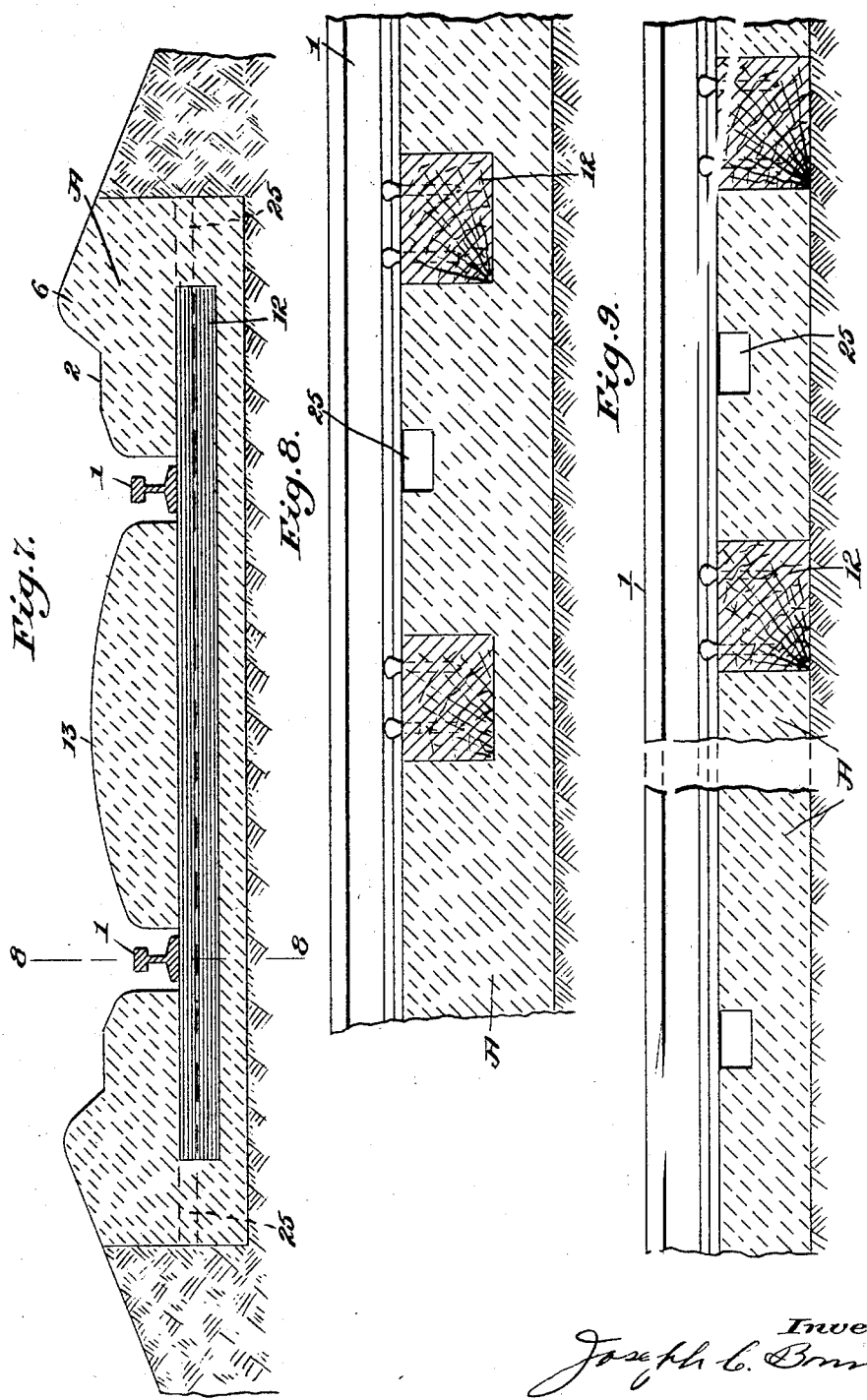
Inventor:
Joseph C. Bonner
By W. P. McElroy
Att'ys.

Patented Feb. 24, 1931

1,793,901

UNITED STATES PATENT OFFICE

JOSEPH CLAYBAUGH BONNER, OF TOLEDO, OHIO

VEHICLE ALIGNING, ELEVATING, AND STORING MEANS

Application filed October 18, 1929. Serial No. 400,581.

My invention relates to vehicle aligning, elevating and storing means; and it comprises in combination with each of the parallel rails of a railroad, an elevated substantially flat tread surface on the outside of each rail and having a guide portion at the outer edge of each of such tread surfaces for guiding and maintaining the wheels of a road vehicle in proper position on the tread surfaces, the ends of the device being inclined or ramped and preferably flared outwardly for properly directing the road vehicle upon the elevated tread surface; and it comprises more particularly a pair of subtracks or rigid aligning structures each having an elevated tread surface and guiding means in combination with parallel rails of a railroad, the tread surfaces being adapted for movement of road vehicles thereon and the guiding means serving to maintain the vehicle wheels in proper position on the tread surfaces, the ends of the device being inclined upwardly from the road bed to the elevated tread surfaces whereby a road vehicle or vehicles, particularly motor driven, may be placed and maintained astraddle the railroad rails in such a position as will permit a flat railroad car or carrier car to be driven beneath the same; all as more fully hereinafter set forth and as claimed.

In transporting freight one of the main problems is the loading and unloading of the goods. Usually the freight is delivered in a road wagon to the freight terminal and there the freight is unloaded and packed in the freight cars. When the freight is delivered to its freight terminal destination, it is then transferred in bulk to road vehicles and delivered to its ultimate destination. In my prior Patent No. 1,280,140, October 1, 1918, I have shown and described a transportation system in which the road wagon is of wider gage than the standard freight car, and in which the arrangement and combination of the road wagon and freight car are such that the freight car may be straddled by the road vehicle and the road vehicle elevated to a point where its wheels are above the track level for transportation. Usually several road vehicles are loaded upon one flat freight car and many such road vehicles are loaded upon a train.

In my prior Patent No. 1,280,143, October 1, 1918, I have shown and described aligning and storing means for road vehicles comprising sub-tracks made of channel iron having a base and substantially vertical longitudinal sides, the ends of the latter being flared so that there is provided at each end a wide path into which the road vehicle may easily be guided, the narrow intermediate portions of said channel irons serving to further guide and hold the vehicle in proper position. I have also shown and described in said patent storage tracks made of angle irons and having inwardly flaring ends.

The present invention has for its object the provision of means for not only aligning and storing road vehicles in straddled position across a pair of parallel railroad rails, but also for properly elevating the vehicles and maintaining the same in elevated position so that a carrier vehicle such as a standard railroad flat car may be driven thereunder and the road vehicles or carried cars placed in carrying position upon the carrier car without the use of elevating means upon the later, the device being of such height and configuration as not to interfer with railroad equipment and such as not to incumber the service railroad tracks and adjacent grounds for movement of trains as well as road vehicles thereover.

Other objects and advantages of my invention will appear from the more detailed description of my novel aligning, elevating and storing device.

Briefly stated, my invention comprises the provision along the outside edge of each of a pair of railroad rails, a structural element or subtrack having ends inclined upwardly from the road bed and terminating in an elevated tread surface for reception of the wheels of the road or carried vehicles and having at its outer edge a guide portion or flange for insuring proper positioning and maintenance of the vehicle wheels upon the tread surfaces whereby the road vehicles are held in straddled and elevated position across the railroad rails for loading upon a carrier car, the entire structure being of any suitable length, depending upon the number of vehicles to be loaded upon a carrier car or cars, and being of minimum height and of such configuration as to permit a road vehicle or motor driven truck to cross the railroad rails at an angle without difficulty. My novel aligning, elevating, and storing device may be constructed of wood, metal, concrete, (reinforced if desired), or the like, the same being preferably formed of concrete as hereinafter shown and described. I also provide novel means for anchoring the subtrack to the railroad rails, and according to other modifications of my invention I may construct the entire device and adjacent railroad bed of poured concrete.

In the accompanying drawings, showing several specific embodiments of my aligning, elevating, and storing means to which the invention is by no means limited:

Fig. 1 is a cross sectional view showing in elevation the wheels of a carried vehicle and a carrier vehicle in their respective positions, with the former in place upon my improved device and the latter upon the railroad rails;

Fig. 2 is a cross sectional view of a standard railroad car or locomotive wheel and journal box and illustrating the provision of ample clearance space between the subtrack and standard journal box equipment;

Fig. 3 is a cross sectional view illustrating the carrier car and a plurality of carried vehicles upon the railroad rails and aligning subtrack respectively;

Fig. 4 is an elevation showing a plurality of carried vehicles upon a flat freight car, the wheels of the former being positioned upon the elevated tread surface and the wheels of the latter upon the railroad rails;

Fig. 5 is a longitudinal section through one form of aligning device and showing the manner in which the same may be assembled in sections;

Fig. 6 is a plan view of one of the inclined and outwardly flaring ends of the subtrack for guiding the road vehicle upon the tread surface;

Fig. 7 is a cross sectional view showing the entire device and road bed formed of concrete in accordance with one form of the invention;

Fig. 8 is a section taken on the line 8—8 of Fig. 7; and

Fig. 9 is a section similar to Fig. 8 but showing the concrete foundation terminating with the bottom of the railroad ties.

Referring more particularly to the drawings, A designates generally the improved aligning, elevating and storing means or subtrack positioned lengthwise and outside each of the railroad rails 1 and parallel therewith. In the drawings I have illustrated the device as formed of solid concrete, but it is, of course, to be understood that the same may be constructed of wood, steel or the like. A substantially flat tread surface 2 runs lengthwise of the subtrack at a point slightly elevated above the rails 1 for the reception and movement thereon of wheel 3 of the carried or road vehicle 4. The ends of the subtrack are inclined from the elevated tread surface to the road bed as illustrated at 5 in Fig. 4 so that the road vehicle may be driven on to the elevated substantially flat tread surface. Lengthwise of the elevated tread surface and at the outer edge thereof there is provided an elevated projection or guiding portion 6 to insure proper positioning and maintenance of the wheels upon the tread surface, extensions 7 of guide member 6 flaring outwardly on each of the inclined ends of the subtrack as shown in Fig. 6 to serve as a steering means for the vehicle wheels and to direct the same on to elevated tread surface 2. In order to maintain the gage of the carried vehicle at the maximum allowed by roadway limits, I have shown conventionally in Fig. 1 the journal box 8 of car wheel 9 positioned inside the latter and the axle shortened correspondingly, the numeral 10 designating the carrying portion of a flat freight car.

In Fig. 2 I have shown the standard railroad construction of locomotive or freight car 10' having wheel 9' and journal box 8', the elevating, aligning and storing device A being of insufficient height to interfere with standard railroad equipment and allowing ample clearance therefor.

In Fig. 1 I have shown the subtrack A imbedded in earth which slopes away from the top of guide portion 6, and the space between rails 1 provided with cobble stones 11 to permit road vehicles to move without difficulty across the rails, the configuration of my device and the fact that it is relatively low thereby assisting, rather than interferring with such movement. In Figs. 3 and 7 I have illustrated both subtracks and the railroad bed formed of a continuous mass of poured concrete in which the railroad ties 12 are imbedded and the space between the rails filled with concrete 13 to permit movement of road vehicles across the rails, the guide portions 6 being here shown as sloping downwardly to meet the inclination of the surrounding earth.

In the construction as illustrated in Fig. 1 the aligning device is anchored to the railroad rail by means of an iron bar 14 having upturned end 15 for engaging the bottom inner portion of rail 1, and having upturned flange 16 at the other end, there being sufficient space left between subtrack A and flange 16 for the reception of a wedge 17. As is obvious, the construction just described enables the device A to be locked securely to the rail. In order to impart aligning aid and strength to subtrack A, I may armor the top surface of the same with an iron plate 18 or the like as shown in Fig. 1. The inner portion of the subtrack is shaped to provide a projection 26 to abut against the upper part of the railroad rail to prevent the subtrack from being forced upwardly when wedge 17 is driven in place.

In Fig. 3 I have designated diagrammatically the crosswise sill member 10 of the carrier rail car provided on both sides with devices 19 for locking together the carrier car and the carried road vehicle when the former is driven beneath the latter, the device serving to lock and maintain both the car and the vehicle fastened together so that the latter may be hauled off the elevated tread surfaces after which it remains supported astraddle the carrier car. This construction forms no part of the present invention, but constitutes the subject matter of application Serial No. 400,582, filed October 18, 1929, and the details of construction therefore are omitted from the present application.

Instead of forming the subtrack of a single solid mass of concrete or similar material, I may construct the same of any number of sections 20 as illustrated in Fig. 5, the sections having dove-tailed or mortise engagement with each other as shown at 21 to thereby lock the same together against slipping. The sections may be further held together by means of rods 22 passed through suitable borings in the sections. Recesses 23 are formed in these sections as shown for the reception of nuts 24 on the opposite ends of rods 22, the arrangement being such that two adjacent sections are firmly held together by means of a single rod 22 and its associated nuts 24 in the recesses 23 or a single rod may be employed to bolt together any number of the sections 20. As another modification, the sections 20 may be provided with a plurality of borings as illustrated in Fig. 1 and rods 22 installed in pairs, using alternate borings to lock together several sections with several other sections until there is obtained a unitary subtrack construction of any desired length.

As already stated, the subtrack A, instead of being constructed in the manner just described, may be formed integral with the railroad bed by a continuous mass of poured concrete suitably molded and in such construction the railroad ties 12 may be surrounded on all four sides with concrete as illustrated in Fig. 7 or else the bottom of the ties may be flush with the earth as illustrated in Fig. 9, and merely the space between the ties and the rails filled with concrete. When constructing the road bed of concrete I preferably form therein drainage vents or recesses 25 to drain off water that may otherwise accumulate between the track rails and the concrete subtracks A.

From the foregoing it is believed that the operation of my novel aligning, elevating, and storing device is obvious. By means of the inclined ends 5 and the outwardly flaring guide portions 7, the road or carried vehicle is effectively guided on to the substantially flat elevated tread surfaces 2 and the wheels thereof, by means of guide portions 6, retained in straddled position across the railroad rails. When a suitable number of road or carried vehicles are aligned with respect to and over the railroad rails, the railroad flat car or cars or carrier vehicles are driven thereunder and by means of the diagrammatically illustrated elements 19 the road vehicles and flat car are securely locked together. The road vehicles thus loaded upon the freight car are now ready for haulage, and when the train is driven beyond the length of the elevated tread surfaces, the road vehicle wheels remain suspended above the ground until the unloading point is reached where similar subtracks are provided in association with the railroad rails for enabling removal of the carried vehicles from the carrier cars. The aligning, elevating and storing devices or subtracks are best, although not necessarily, arranged upon a siding in order that the road vehicles may be stored for any length of time without interfering with the railroad schedule.

Having described my invention, I claim:

1. The combination with parallel rails of a railroad, of vehicle aligning and elevating means comprising a tread surface for road vehicle wheels on the outside of each rail and elevated above the same and a guide member at the outer edge of said tread surface and disposed longitudinally thereof, said surface having downwardly sloping ends.

2. In combination, a pair of parallel railroad rails, a tread surface for road vehicle wheels on the outside of each of the rails and elevated above the same, a guide member at the outer edge of said surface and disposed lengthwise thereof, said surface terminating in downwardly sloping and outwardly flaring end portions, and outwardly flaring extensions of said guide member on said end portions.

3. In combination with a pair of railroad rails, a subtrack on the outside of each of the railroad rails and disposed longitudinally thereof, said subtrack having a substantially flat surface elevated above the rail, a guide portion for vehicle wheels at the outer edge of said surface, and downwardly inclined ends for said surface.

4. In combination with a pair of railroad rails a solid subtrack on the outside of each of the railroad rails and disposed lengthwise thereof, said subtrack having a substantially flat surface parallel with the rail and elevated above the same and a guide flange disposed longitudinally of said surface, the ends of said subtrack sloping downwardly away from said surface, and means for holding said element in fixed relation to the rail.

5. The combination as set forth in claim 4 further characterized in that an inclined surface is provided for the outer edge of said subtrack sloping downwardly from said guide flange to the road bed and the space between the railroad rails filled in at least in part whereby a road vehicle may move freely across the railroad rails and their associated subtracks.

6. A vehicle aligning device adapted to be placed along the outside of a railroad rail comprising a substantially solid subtrack so formed as to provide a tread surface for road vehicle wheels and a guide portion at the outer edge of said surface, the thickness of said subtrack from said surface to the bottom thereof being such as to maintain said surface above the top of said railroad rail, and said subtrack further being provided with downwardly sloping ends.

7. A vehicle aligning device as set forth in claim 6 further characterized in that the outer marginal edge of said subtrack slopes downwardly away from said guide portion.

8. A vehicle aligning device adapted to be placed along the outside of a railroad rail comprising a subtrack so formed as to provide a tread surface for road vehicle wheels and a guide portion at the outer edge of said surface, the thickness of said subtrack from said surface to the bottom thereof being such as to maintain said surface above the top of said railroad rail, and said subtrack further being provided with downwardly sloping ends and outwardly flaring extensions of said guide portion on said ends.

9. In combination with a pair of parallel rails of a railroad, a subtrack on the outside of each of the rails and disposed longitudinally thereof, said subtrack comprising a tread surface for road vehicle wheels elevated above the rail, a guide member for the vehicle wheels, and a downwardly inclined end from said surface to the road bed.

10. In combination with a pair of parallel rails of a railroad, a subtrack on the outside of each of the rails and disposed longitudinally thereof, said subtrack having a substantially flat surface parallel with the rail and elevated above the same and a guide flange adjacent the outer edge of said surface, a runway inclined downwardly from an end of said surface to the roadbed, and means for retaining said subtrack in fixed relation to the rail.

11. A vehicle aligning device adapted to be placed along the outside of a railroad rail comprising a tread surface for road vehicle wheels elevated above the rail, a guide member for the vehicle wheels, and an end portion sloping downwardly from said surface.

JOSEPH C. BONNER.